United States Patent Office 2,809,706
Patented Oct. 15, 1957

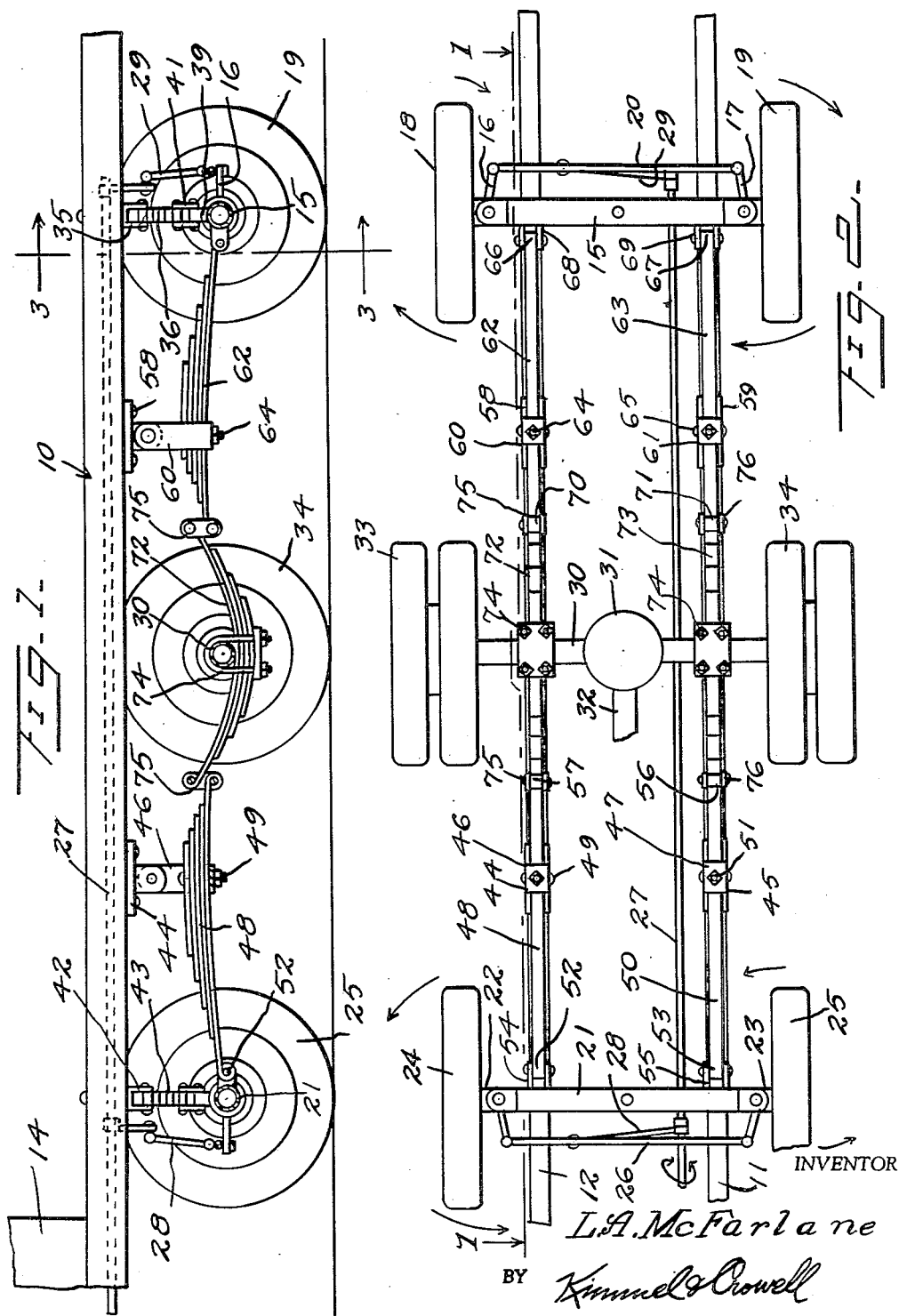

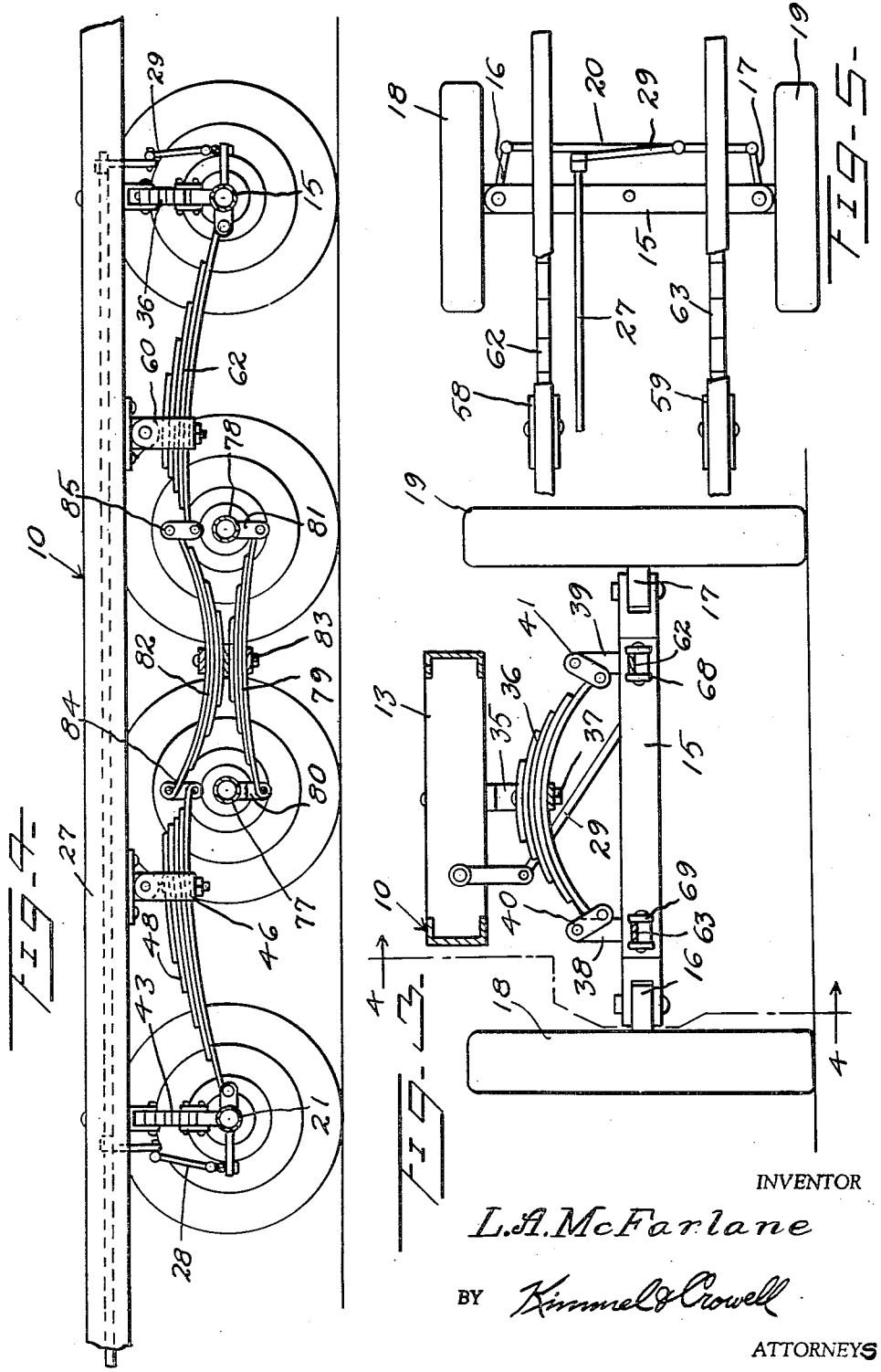

2,809,706

MOTOR VEHICLE SPRING SUSPENSION

Lloyd A. McFarlane, Salem, Oreg.

Application November 22, 1955, Serial No. 548,324

1 Claim. (Cl. 180—22)

The present invention relates to motor vehicles, and more particularly to a spring suspension for tandem-wheeled vehicles.

The primary object of the invention is to provide a spring suspension for tandem wheeled-vehicles which will reduce strains and stresses imposed on the chassis of the vehicle by the road conditions and maintain the vehicle free of shock due to holes in the road.

Another object of the invention is to provide a spring suspension for tandem-wheeled vehicles which will increase the load-carrying capacity of the vehicle by equalizing the axle loading thereof.

A further object of the invention is to provide a spring suspension for a six-wheeled vehicle which will maintain each set of wheels in full contact with the road surface despite unevenness thereof.

A still further object of the invention is to provide a spring suspension for vehicles having eight wheels including dual driving wheels which will equalize the axle loading throughout.

Another object of the invention is to provide a spring suspension for motor vehicles of the class described, which will be inexpensive to manufacture, economical to install and maintain and superior in operation.

Other objects and advantages will become apparent in the following specification when considered in the light of the attached drawings, in which:

Figure 1 is a longitudinal cross-section taken along the line 1—1 of Figure 2, looking in the direction of the arrows;

Figure 2 is a fragmentary bottom plan view;

Figure 3 is a transverse cross-section taken along the line 3—3 of Figure 1, looking in the direction of the arrows;

Figure 4 is a longitudinal cross-section of a modified form of the invention, taken along the line 4—4 of Figure 5, looking in the direction of the arrows, and Figure 5 is a fragmentary bottom plan view of the invention disclosed in Figure 4.

Referring now to the drawings in detail, wherein like reference numerals indicate like parts throughout the several figures, the reference numeral 10 indicates a chassis of a vehicle comprising channel members 11 and 12 mounted in parallel spaced-apart relation and connected by a plurality of suitable cross members 13. Frame 10 is of a conventional nature and supports at the forward portion thereof a motor and driver's cab, a fragment of which is illustrated at 14.

Axle 15 is positioned under one end portion of the chassis 10 and is provided with steering knuckles 16 and 17 upon which are mounted wheels 18 and 19. A tie rod 20 is secured between the steering knuckles 16 and 17 for purposes to be described. The opposite end of the vehicle chassis 10 has an axle 21 positioned thereunder identical in every respect to axle 15 and provided with steering knuckles 22 and 23 at the opposite ends thereof. Steering knuckles 22 and 23 are identical to steering knuckles 16 and 17 and are faced oppositely thereto.

Wheels 24 and 25 are secured to the steering knuckles 22 and 23, respectively, and a tie rod 26 is secured to the steering knuckles 22 and 23 for purposes to be explained. A rotatable steering member 27 is journalled within the chassis 10 and carries steering arms 28 and 29 thereon which are connected respectively to the tie rods 26 and 20 so that rotation of the steering member 27 will cause lateral movement of the tie rods 20 and 26, thus moving the wheels 18, 19, 24 and 25 to steer the vehicle. Obviously the paired wheels 18 and 19 turn oppositely to the wheels 24 and 25 so as to move in arcs from the same center.

A driving axle 30 positioned in parallel relation between the axles 15 and 21 is provided with a differential 31 driven by a drive shaft 32. Driving wheels 33 and 34 are operatively secured to the opposite ends of the drive axle 30 for engagement with the road surface. A spring hanger 35 is positioned under the cross member 13 over the axle 15 and has a leaf spring 36 clamped at its mid point therein by means of a spring center bolt 37. The axle 15 is provided with oppositely disposed spring hangers 38 and 39 which extend upwardly from the axle 15 carrying spring shackles 40 and 41. The opposite ends of the leaf spring 36 are supported by the lower ends of the spring shackles 40 and 41.

The axle 21 is mounted identically to the axle 15 through a spring hanger 42 supported from the chassis 10 and a spring 43 mounted identically to the spring 36. A bearing block 44 is secured to the channel member 11 and a bearing block 45 is secured to the channel member 12, with the bearing blocks 44 and 45 axially aligned with their axis parallel to the axle 21. A U-shaped spring hanger 46 is pivotally suspended from the bearing block 44 and a U-shaped spring hanger 47 is pivotally suspended from the bearing block 45. A leaf spring 48 is clamped in the spring hanger 46 by means of a center bolt 49, and a spring 50 is clamped in the spring hanger 47 by means of a center bolt 51. The springs 48 and 50 terminate in loops 52 and 53 adjacent the axle 21 and are secured thereto by means of spring brackets 54 and 55. The opposite ends of the springs 48 and 50 terminate in loops 56 and 57 at points substantially closer to the spring hangers 46 and 47 than the loops 52 and 53.

A bearing block 58 is secured to the channel member 12 and a second bearing block 59 is secured to the channel member 11, with the bearing blocks 58 and 59 axially aligned with their axis parallel to the axle 15. The bearing blocks 58 and 59 are spaced apart from the bearing blocks 44 and 45. U-shaped spring hangers 60 and 61 are pivotally secured to the bearing blocks 58 and 59, respectively, and carry leaf springs 62 and 63, respectively, therein. Center bolts 64 and 65 clamp the leaf springs 62 and 63 in the spring hangers 60 and 61, respectively. The one end of the springs 62 terminates in a loop 66 and the adjacent end of the spring 63 terminates in a loop 67. Spring brackets 68 and 69 are secured to the axle 15 and have the loops 66 and 67, respectively, secured therein. The opposite ends of the springs 62 and 63 terminate in loops 70 and 71, respectively. A leaf spring 72 is secured to the axle 30 at one side thereof and a leaf spring 73 is secured to the axle 30 at the other side thereof. U-bolts 74 clamp the springs 72 and 73 to the axle 30. Shackles 75 join the opposite ends of the spring 72 to the inner ends of the springs 48 and 62 and shackles 76 join the opposite ends of the spring 73 to the inner ends of the springs 50 and 63, thus it can be seen that the driving wheels 33 and 34 are supported by springs 72 and 73 which are in turn supported completely by the springs 48, 62, 50 and 63, respectively.

Figures 4 and 5 disclose a modified form of the invention in which a pair of driving axles 77 and 78 are mounted between the steerable axles 15 and 21. The steerable axles 15 and 21 are supported from an identical structure to that disclosed in the preferred form of the invention illustrated in Figure 1. A leaf spring 79 extends between the driving axles 77 and 78 on each side thereof and is secured to the driving axles 77 and 78 by spring brackets 80 and 81, respectively. A second leaf spring 82 is secured to the leaf spring 79 with the leaves thereof arranged oppositely to the leaves 79. A clamp 83 secures the springs 79 and 82 together at their mid portions. Shackles 84 and 85 secure the opposite ends of the leaf spring 82 to the inner ends of the leaf springs 48 and 62, thus providing a combined spring suspension for the driving axles 77 and 78 supported completely from the springs 48, 50, 62 and 63.

The mounting illustrated in Figures 1 through 3 provides a complete spring suspension for a multi-axle vehicle in which the driving axle is suspended from the springs supporting the steerable axles so that the axles are equalized with respect to the chassis load carried thereby. In the modified form of the invention illustrated in Figures 4 and 5, a second driving axle is suspended from an additional spring member to likewise equalize the chassis loads on each of the axles of the device.

Having thus described the preferred embodiments of the invention, it should be understood that numerous structural modifications and adaptations may be resorted to without departing from the scope of the appended claim.

What is claimed is:

In a motor vehicle, a chassis having front and rear ends, a front and rear steerable axis supporting said front and rear ends, a transverse leaf spring suspended medially from each said end of said chassis, the ends of the front transverse leaf spring secured to the front steerable axle and the ends of the rear transverse leaf spring secured to the rear steerable axle, a front pair of spaced parallel longitudinal leaf springs, a rear pair of spaced parallel longitudinal leaf springs, means depending from said chassis supporting each of said front and said rear longitudinal leaf springs medially thereof with said front and rear pairs of longitudinal leaf springs in longitudinally spaced and aligned relation, said front pair of longitudinal leaf springs having the front ends thereof pivotally connected to opposite ends of said front steerable axle, said rear pair of longitudinal leaf springs having the rear ends thereof pivotally connected to opposite ends of said rear steerable axle, a pair of spaced parallel central longitudinal leaf springs positioned between said front and rear pairs of longitudinal leaf springs, means pivotally connecting the front ends of said central longitudinal leaf springs to the rear ends of said front pair of longitudinal leaf springs, means pivotally connecting the rear ends of said pair of central longitudinal leaf springs to the front ends of said rear pair of longitudinal leaf springs, and a transverse driving axle mounted medially of said chassis and supported medially on each of said central longitudinal leaf springs.

References Cited in the file of this patent
UNITED STATES PATENTS

| Number | Name | Date |
| --- | --- | --- |
| 1,126,326 | Whittelsey | Jan. 26, 1915 |
| 1,205,858 | Corcoran | Nov. 21, 1916 |
| 1,248,027 | Smeltzer | Nov. 27, 1917 |
| 1,436,031 | Furlong | Nov. 21, 1922 |
| 2,032,721 | Schaefer | Mar. 3, 1936 |
| 2,491,994 | McFarlane | Dec. 20, 1949 |